Feb. 2, 1960 G. A. TINNERMAN 2,923,385
RETAINERS
Filed Nov. 7, 1956 2 Sheets-Sheet 2

Inventor
GEORGE A. TINNERMAN
By~ Fetherstonhaugh & Co
Att'ys

Feb. 2, 1960   G. A. TINNERMAN   2,923,385
RETAINERS
Filed Nov. 7, 1956   2 Sheets-Sheet 1
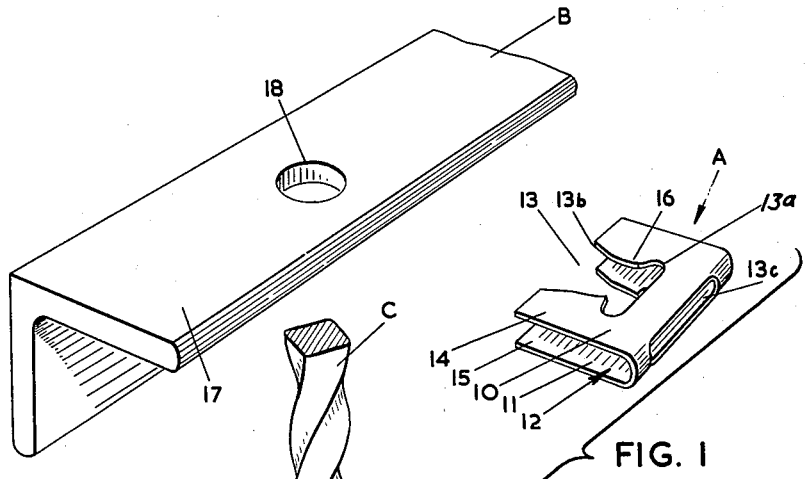
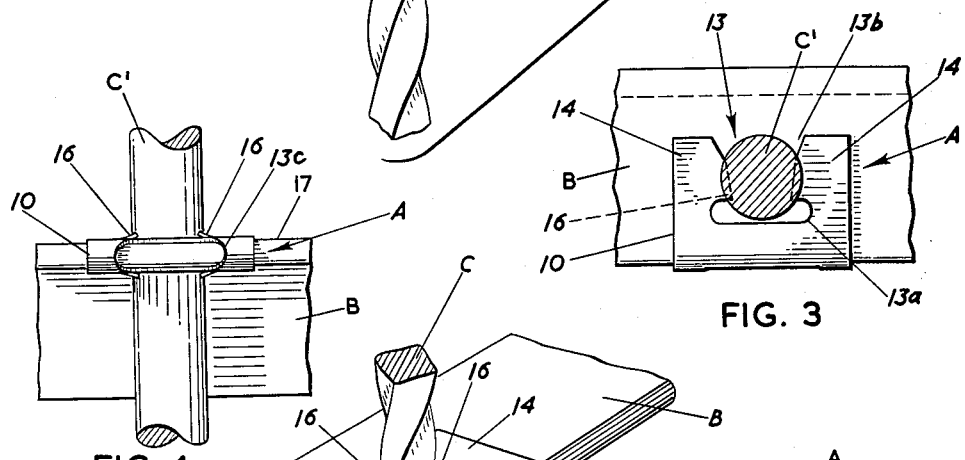
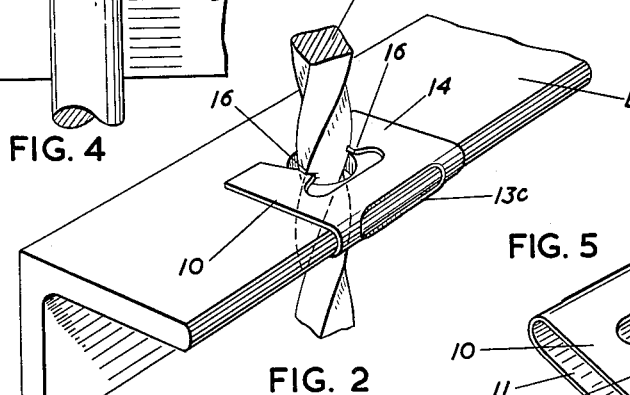
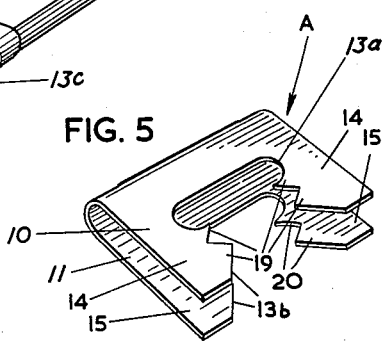
Inventor
GEORGE A. TINNERMAN
By~ Fetherstonhaugh + Co.
Att'ys United States Patent Office 2,923,385
Patented Feb. 2, 1960

2,923,385
RETAINERS
George A. Tinnerman, Lakewood, Ohio
Application November 7, 1956, Serial No. 620,936
6 Claims. (Cl. 189—35)

This invention relates to retaining clips and particularly clips for retaining rods or bars in secured angular relation to one another.

In the securement of reinforcing rods for concrete and the like wherein the rods are disposed substantially at right angles to one another, many forms of securement have been proposed including wire clips and the like. In order to effect proper securement, it is necessary to adjust the fasteners carefully which requires precise application and in many cases the rods will not be held as securely as may be desired. Again, as a further example, iron fences involving bars and/or rods disposed in angular relation to one another have entailed complication in securement usually requiring skilled labor and a great deal of time in erection. The present invention in its several applications provides a retainer which may be fastened securely by driving it in very conventional manner and which will function to hold the parts very securely together avoiding the work and care necessary with other means of securement.

The invention generally comprises a retaining clip of sheet metal bent upon itself to form a body having spaced apart walls defining therebetween a receiving channel, the walls of the channel being recessed to form pairs of spaced apart jaws providing therebetween a second receiving channel at an angle to the first and having gripping means for gripping one element of two designed to be secured in angular relation to one another, said gripping means tending to bite into one element to lock said retainer thereto, said other element being straddled by the walls of the retainer to locate it securely in relation to the other element, the span between the jaws at least at one point being less than the width of the element straddled thereby and to engage the latter in secured pressure engagement. In some cases, the walls of the retainer may be formed with tongues struck therefrom to contact the element straddled thereby in biting engagement.

The invention will be clearly understood by reference to the following detailed specification taken in conjunction with the accompanying drawings.

In the drawings:

Fig. 1 is an exploded perspective view illustrating the retainer disposed in relation to a horizontal bar of a fence and one of the vertical rods thereof.

Fig. 2 is a perspective composite view of Fig. 1 showing the manner in which the retainer secures a rod and bar in angularly disposed relationship.

Fig. 3 is a top plan view of an assembly such as shown in Fig. 2 but illustrating a cylindrical rod in contrast to a rod of the twisted type.

Fig. 4 is an elevation of Fig. 3.

Fig. 5 is a perspective view of the retainer showing alternative gripping means therefor.

Figure 6:
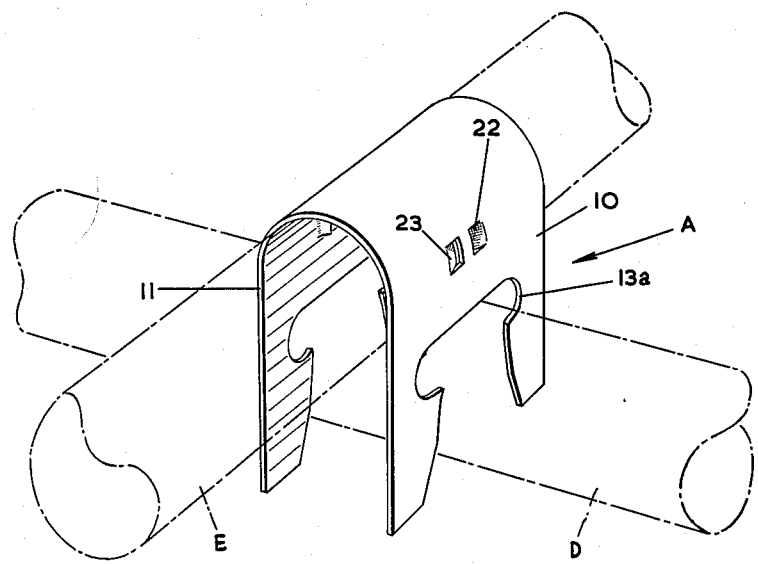
Fig. 6 is a perspective view of the retainer especially adapted for securing concrete reinforcing rods in angularly disposed relationship, the rods being illustrated fragmentarily in dotted lines.

Referring to the drawings, A indicates a retainer according to the present invention formed from a sheet metal body bent upon itself to form side walls 10 and 11 spaced apart from one another to provide therebetween the receiving channel 12 designed to receive one element of two which are designed to be secured in angular relation to one another. The walls 10 and 11 are each recessed as at 13 in registry with one another to form the receiving recess for the second element to be secured. The recess 13 in effect forms in each wall 10 and 11 the spaced apart jaws 14 and 15 respectively, the inner edges of which are designed to firmly engage and in effect bite into the elements with which they engage.

The retainer may be formed from sheet steel such as low carbon or high carbon heat treated steel but is preferably formed from steel having somewhat resilient characteristics. The jaws 14 and 15 are preferably provided with a projecting tooth 16 so as to provide a pair of opposed teeth as between each pair of jaws. Preferably these teeth are outwardly flared slightly from the plane of the side walls from which the jaws are formed. The teeth are designed to have at least a biting action into the surface of the bar which they engage when forced home to unite an assembly, and the outward flaring thereof has the tendency to cause each pair of jaws to flex inwardly towards each other rather than possibly to flex away from one another. Accordingly this action tends to force each pair of jaws into firm engagement with the element which is received in the channel 12 straddled by the pairs of jaws 14 and 15.

A degree of resilience is imparted to the jaws by laterally extending the recess 13 as at 13a. Moreover, it should be noted that both in the forms of structure shown in Figs. 1 and 5, the entrance to the recess 13 is substantially flared outwardly towards the free edges of the walls 10 and 11 as indicated at 13b which forms a guiding means for causing the jaws of the retainer accurately to straddle the element C (or C', Fig. 3) as the case may be when such retainer is driven into securing position.

As shown in Fig. 1 the element B in the form of an angle iron bar is designed to be straddled by the retainer, the channel 12 of retainer A being designed to receive the flange 17 of element B. Element C, to be secured to element B in angularly disposed relation and which may take the form of the twisted rod shown, is designed to be projected through the orifice 18 in flange 17 in the manner of a bar of an iron fence and when so disposed, the retainer A is positioned so that the walls 14 and 15 thereof straddle the flange 17 of element B with the recessed portion of the retainer disposed in registry with the element C. Consequently, when the retainer A is then driven by percussive action in a direction towards the flange 17 of element B, the retainer will be finally located as shown in Fig. 2 wherein the jaws 14 straddle element C and teeth 16 of the jaws 14 engage element C in a tight grip with the teeth tending to bite into the engaged surfaces of element C. This tight biting action results in the element C being firmly held in angularly secured relation to element B. In Figs. 3 and 4, a cylindrical element C' is illustrated in contrast to the twisted element C but in either case the same securing result is achieved.

The outwardly flared teeth 16 are particularly preferable in respect of a twisted rod such as C as they tend to follow the curve of the surface of this type of element. However, they likewise will operate efficiently with a cylindrical rod or square rod as the case may be.

The mode of applying the retainer is preferably by hammering it home once located in position and preferably the clip is provided with an elongated recess 13c in the bent portion thereof substantially aligned with the recess 13 which provides edges reasonably capable of withstanding the blows of a hammer and which will avoid any possible tendency of the walls of the retainer from spreading apart due to percussion directed on the bent portion of the retainer.

As shown in Fig. 5, the retainer A may be formed slightly differently. In this illustration, the jaws 14 and 15 are provided with the pairs of teeth 19 and 20 which are disposed to project laterally within the recess 13.

Figure 7:
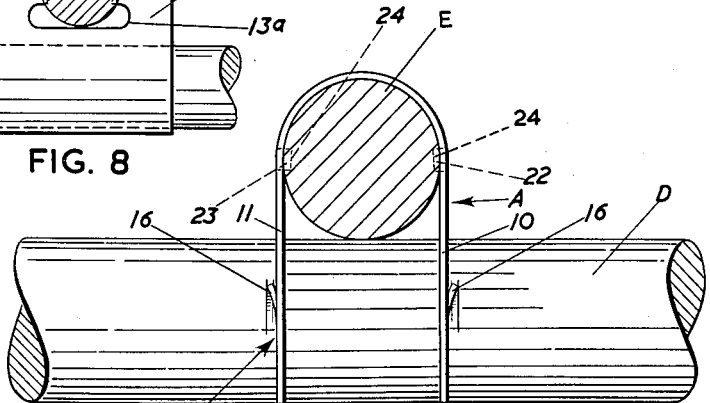
Fig. 7 is an end elevation of the retainer shown in Fig. 6 in relation to a pair of angularly disposed reinforcing rods which are shown fragmentarily and in section.

As shown in Figs. 6 and 7, the retainer A is readily adaptable to use for securing angularly disposed reinforcing rods D and E for concrete or the like. The construction is the same as previously described but in addition, the walls 10 and 11 have tongues 22 and 23 struck therefrom in relatively opposed relation to one another to provide biting edges 24 which engage the rod E which in result will prevent movement of the retainer A in the axial direction of rod E whereas the teeth 16 of the jaws 14 and 15 which are in biting engagement with the rod D not only secure rod D to rod E but also have the effect of preventing movement of the retainer and consequently rod E held within its channel 12 against movement in the axial direction of rod D.

Figure 8:
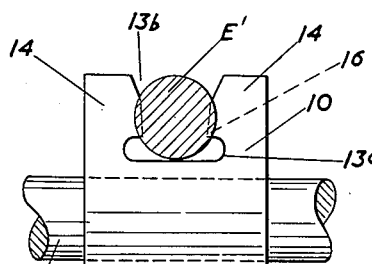
Fig. 8 is a miniature fragmentary view partly in section showing the retainer suspending a rod from another.

While in the construction described a retainer is adapted to hold two elements in angularly disposed contacting relation, it will be clear that it will equally function for retaining such elements in relative angular relation without necessarily maintaining them in contact. For instance, if it is merely desired to suspend element C from element B, the orifices 18 in element B may be somewhat larger than that merely to receive rod C, and the retainer will obviously hold rod C in suspended relation to element B. Furthermore, as shown in Fig. 8, the walls 10 and 11 may be formed longer than that normally required to encompass two bars such as D and E (Figs. 6 and 7) so that the retainer may have the effect of suspending rod D' relatively to rod E'.

The retainer is of very simple construction as is clear from the foregoing and, moreover, is very easy to employ since it is only necessary for the user to dispose the retainer so that its walls will preliminarily straddle one element with the recess 13 in registry with the other element and the parts become automatically locked in their angular relationship merely by driving the retainer into final position. Thus, the retainer avoids time and effort of greater degree often required finally to fasten other forms of retaining elements which have previously been employed for similar purposes. Of course, having regard to the size and character of the elements which it is desired to secure, the retainer of the present invention will be proportioned to meet the necessary requirements, i.e. the width of the channel 12 will be set to accommodate the particular size of element with which it cooperates whereas the span of the recess 13 will accordingly be wider or narrower according to requirements. Moreover, it is of course obvious that the retainer may be made of any material suitable to its purpose.

While in the foregoing I have disclosed preferred forms of construction, it will be appreciated that the retainer may be modified to some extent within the principle thereof. Accordingly, it is intended that the foregoing should be interpreted in an illustrative sense rather than a restrictive sense and not subject to limitation other than the general limits set forth in the appended claims.

What I claim as my invention is:

1. A retainer for rigidly locking a bar and element together in angularly disposed pre-located relation to one another comprising a sheet metal body bent upon itself to form spaced apart opposed walls having free ends and defining a channel therebetween, said walls being recessed inwardly from their free ends and in registry with one another to form pairs of spaced apart jaws, said channel forming receiving means for said element, said recesses forming receiving means for said bar, pre-located with respect to said element and at an angle thereto, said jaws having a span, of least extent, at least at one point therebetween, measuring slightly less than the width of said bar to cause said jaws to engage the latter in secured pressure engagement on each side of said element when said bar is straddled by said jaws, said retainer being capable of sliding under pressure into simultaneous engagement with said element and bar whereby said bar is rigidly secured to said element in angularly disposed relation and against axial displacement with respect thereto when said walls straddle said element and said jaws straddle said bar.

2. A retainer as claimed in claim 1 in which said jaws are provided with teeth projecting inwardly towards said recess.

3. A retainer as claimed in claim 2 in which said teeth are flared outwardly from the plane of said walls.

4. A retainer as claimed in claim 1 in which the bent portion thereof is formed with an elongated orifice forming free edges for percussive contact.

5. A retainer as claimed in claim 1 in which said recesses are laterally elongated at their inner extremities, the edges of said jaws bordering said recesses being formed with teeth at the span of least extent, said teeth terminating at said lateral elongation of said recesses.

6. A retainer for rigidly locking a bar and element together in angularly disposed prelocated relation to one another comprising a sheet metal body bent upon itself to form spaced apart opposed walls having free ends and defining a channel therebetween, said walls being recessed inwardly from their free ends and in registry with one another to form pairs of spaced apart jaws, said channel forming receiving means for said element, said recesses forming receiving means for said bar, pre-located with respect to said element and at an angle thereto, said jaws having a span, of least extent, at least at one point therebetween, measuring slightly less than the width of said bar to cause said jaws to engage the latter in biting pressure engagement, the edges of each pair of said jaws converging inwardly to said span of least extent, said edges, at said span of least extent, being flared outwardly from the plane of said walls, the edges of one pair being flared in a direction opposed to the other pair, said retainer being capable of sliding under pressure into simultaneous engagement with said element and said bar whereby said bar is rigidly secured to said element in angularly disposed relation and against axial displacement when said walls straddle the said element and said jaws straddle the said bar.

References Cited in the file of this patent

UNITED STATES PATENTS

| 1,029,612 | Johnson | June 18, 1912 |
| 2,590,450 | Parsons | Mar. 25, 1952 |

FOREIGN PATENTS

| 521,128 | Canada | Jan. 24, 1956 |